Aug. 15, 1967  M. C. HEMSWORTH  3,335,567
MULTI-NOZZLE FUEL DELIVERY SYSTEM
Filed Nov. 19, 1965  2 Sheets-Sheet 1
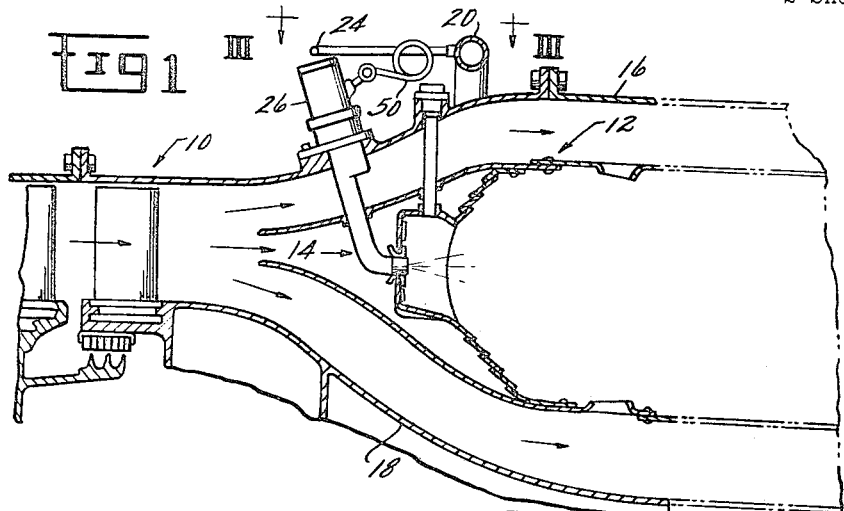
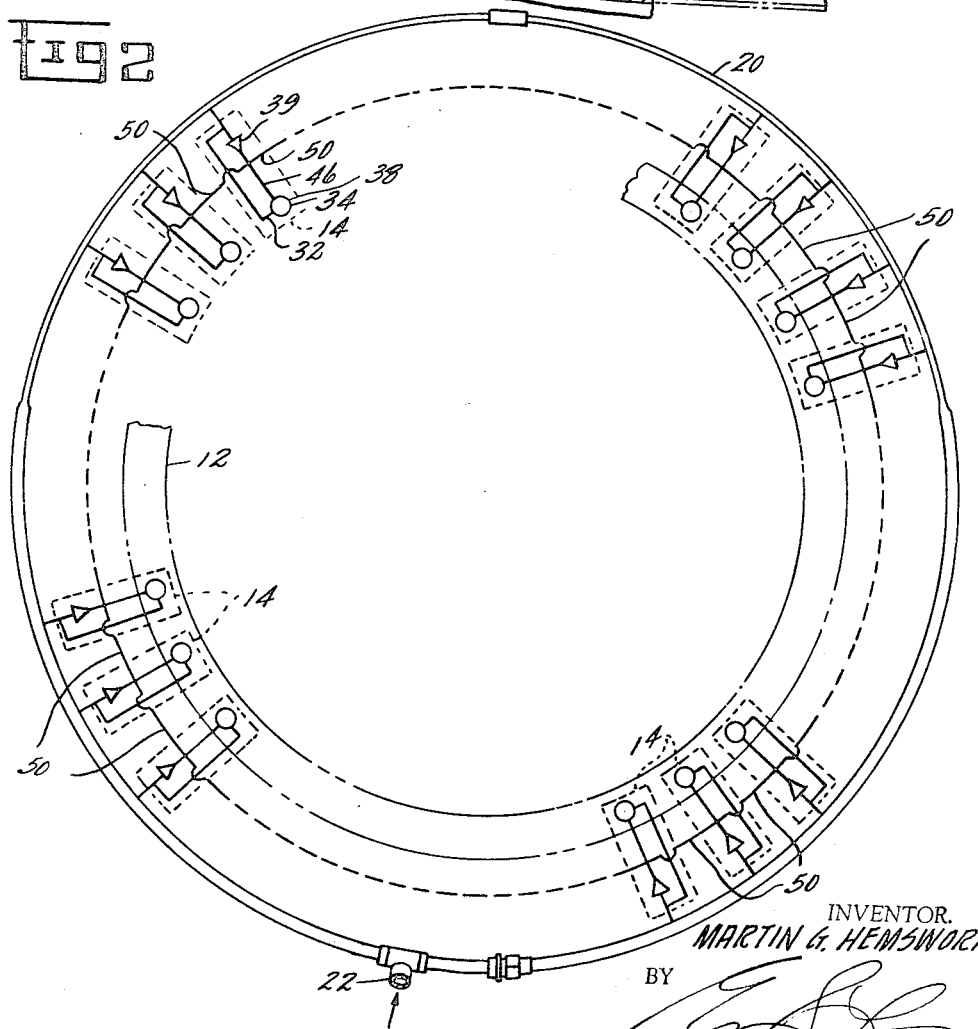
INVENTOR.
MARTIN G. HEMSWORTH
BY

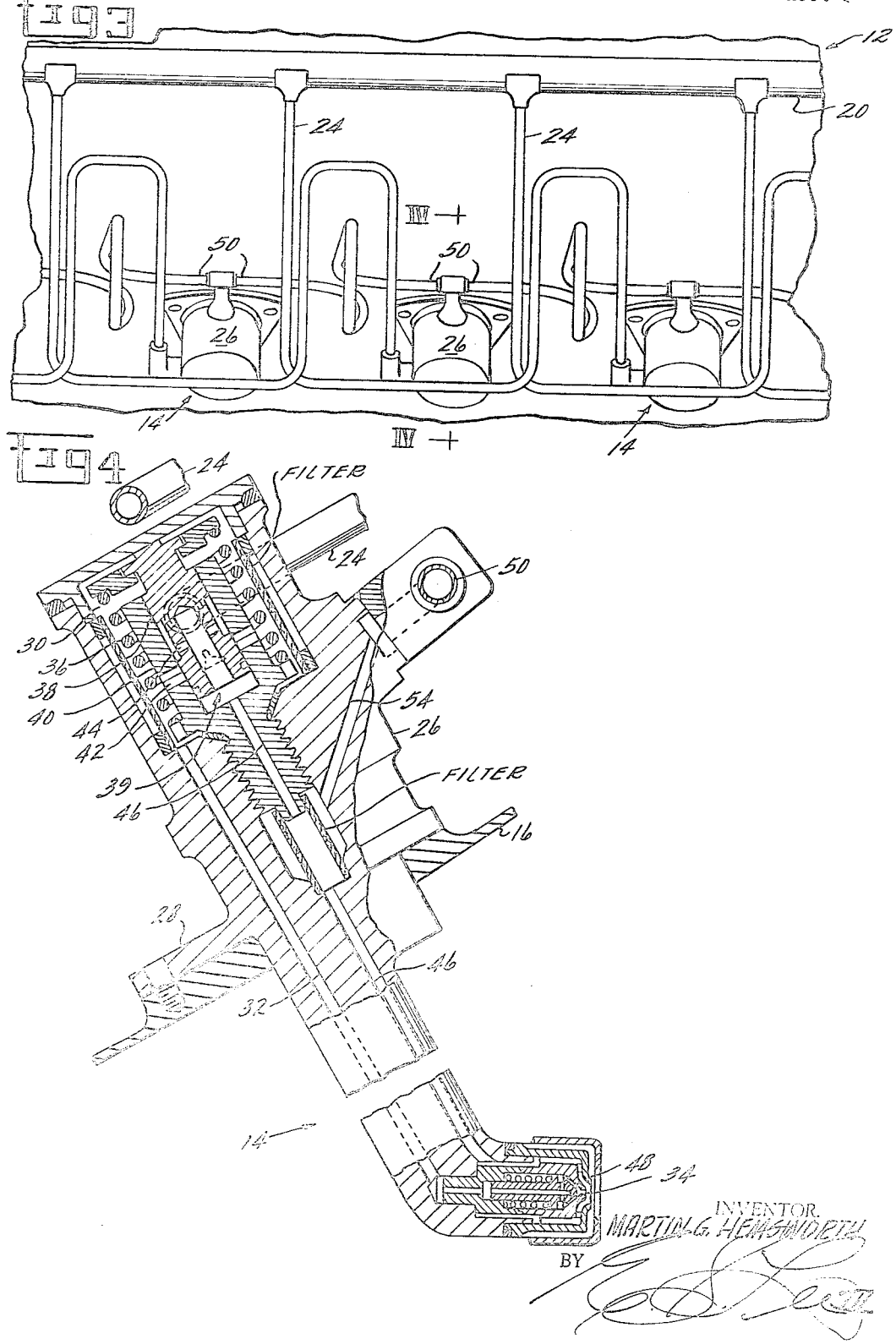

United States Patent Office 3,335,567
Patented Aug. 15, 1967

3,335,567
MULTI-NOZZLE FUEL DELIVERY SYSTEM
Martin C. Hemsworth, Cincinnati, Ohio, assignor to General Electric Company, a corporation of New York
Filed Nov. 19, 1965, Ser. No. 508,742
4 Claims. (Cl. 60—39.74)

The present invention relates to improvements in fuel delivery systems employing a plurality of fuel nozzles.

The present invention is best understood by referring to its motivating environment, namely, gas turbine engines which are widely used in the propulsion of aircraft. Such engines basically comprise an axial flow compressor which compresses air for combustion with fuel in an annular combustor. The products of combustion drive a turbine that powers the axial flow compressor and then are directed through a discharge nozzle to obtain a propulsive jet force. In this and other engines where the combustor is in the form of an annulus, a plurality of fuel nozzles are spaced therearound so that there is substantially uniform combustion in the combustor.

Particularly in the propulsion of aircraft there is a wide range of power demand on the engines. To meet this demand, fuel nozzles have been developed which have two nozzle elements. During low power operation fuel is supplied from this single nozzle element. When power demand becomes greater, fuel pressure increases to open a valve, permitting fuel to flow to a second nozzle element. The two nozzle elements efficiently provide the higher volume of fuel required for effective combustion and generation of greater energy or power.

One serious problem with such fuel nozzles is that occasionally the valve controlling fuel flow to the second nozzle element will remain open when the fuel pressure is below the level at which it normally closes. Thus a condition occurs where one nozzle is discharging fluid from two nozzle elements, while the remaining nozzles are discharging fuel from a single nozzle element. This results in a high concentration of heat which, because of its intensity and the fact that there would usually be less cooling air available, can literally burn out the combustor or seriously damage it because of thermal stress resulting from such heat concentration.

The object of the present invention is to overcome the above-described problems in delivering fuel in a multi-nozzle system for an engine having a wide range of performance demands.

To these ends the nozzles as above described are interconnected by conduit means which distribute fuel from a malfunctioning valve to reduce the heat at that valve and further to distribute the heat over a relatively large area of the combustor.

The above and other related objects and features of the invention will be apparent from a reading of the following description of the disclosure found in the accompanying drawings and the novelty thereof pointed out in the appended claims.

In the drawings:

FIGURE 1 is a fragmentary, longitudinal section of a gas turbine engine embodying the present invention;

FIGURE 2 is a schematic illustration of the invention;

FIGURE 3 is a view, on an enlarged scale, taken generally on line III—III in FIGURE 1; and FIGURE 4 is a section, on a further enlarged scale, taken on line IV—IV in FGURE 3.

Referring first to FIGURE 1, the fuel feeding system of the present invention is most particularly adapted for gas turbine engines as indicated by the fragmentary representation therein. In such engines air is compressed by an axial flow compressor, the final stage of which is indicated at 10. A portion of this air enters an annular combustor 12 for ignition with fuel discharged from nozzles 14. The remainder of the air, among other things, serves as a cooling agent and passes on opposite sides of the combustor 12 through passageway defined by the outer engine casing 16 and an inner liner 18. The products of combustion are discharged from the combustor 12 and employed in known fashion to drive the axial flow compressor and then to generate a power output such as a propulsive jet force.

The nozzles 14 are equally spaced in a circle about the annular combustor 12 (see the schematic showing of FIGURE 2) to maintain substantially uniform temperature in the combustor.

The amount of fuel to be delivered by the nozzles 14 varies widely for different engine operating conditions. The manner in which fuel flow is controlled to provide desired engine operation forms no part of this invention. Suffice it to say that pressurized fuel is introduced into a circular manifold 20 through an inlet 22 (FIGURE 2). Tubes 24 then feed the fuel to the individual nozzles 14 (see also FIGURE 3). It will be seen that the tubes 24 are formed with a series of bends to accommodate differential expansion between the manifold 20 and the combustor 12.

Each nozzle 14 comprises a housing 26 having a flange 28 by which it is secured to the combustor 12. The respective tube 24 is secured to the housing 26 for entry of fuel into an upper chamber 30. A passageway 32 then carries the fuel to an inner atomizing nozzle 34 which is capable of discharging fuel and properly maintaining combustion for low rates of engine operation.

When greater power output is desired, fuel pressure is increased, overcoming the force of spring 36 on a flanged valve plunger 38 comprising a valve 39. When this occurs, the plunger 38 is depressed further into an inner housing 40, bringing holes 42, 44 into alignment. Fuel then flows through a passageway 46 compositely formed in the plunger 38 and housings 26 and 40 to a second and larger atomizing nozzle 48 which is concentric of the nozzle 34.

The portions of the nozzle 14 so far described are known to those skilled in the art and for that reason some details related thereto have been omitted in this description. The point to note is that for low power requirements fuel is provided by one atomizing nozzle and for greater power requirements fuel is discharged from both atomizing nozzles.

In engine operation the changeover between single and double nozzle operation occurs at essentially the same time so that there is a uniform distribution of heat around the combustor 12.

While these nozzles are quite reliable, aircraft operation in particular requires that every precaution be taken against a malfunction. It is recognized that valve plunger 38 could remain in its depressed position when fuel pressure has been decreased. This type of malfunction most likely occurs in a single nozzle 14 with the others functioning properly. In such event the extremely large amount of fuel from the malfunctioning valve would cause a concentration of heat in a localized area of the combustor. Such a heat concentration causes thermal stress and could readily burn out the combustor and even cause complete engine failure.

With these things in mind, each of the nozzles 14 is interconnected by tubes 50 with the adjacent valve on either side thereof (FIGURES 2 and 3). The tubes 50 are convoluted to prevent problems of differential expansion. The ends of the tubes 50 are thus respectively connected to bosses 52 formed on the nozzle housings 26. A passageway 54 then places the tubes 50 of a given nozzle in communication with the passageway 46 on the downstream side of the valve 39 which controls fuel flow to the large capacity discharge nozzle 48.

In normal operation there is essentially no fuel flow through the interconnecting tubes 50. They are simply maintained at the pressure of the passageways 46. In the event of a valve failure in one of the nozzles 14 fuel then flows through the tubes 50 and is distributed to other adjacent nozzles 14 to either side of the malfunctioning nozzle. The benefits obtained are twofold. First, the fuel flow from the malfunctioning nozzle is minimized, and this reduces the maximum heat to be contended with. Secondly, since adjacent nozzles provide a progressively decreasing amount of heat, there is a minimum of thermal stress.

Preferably the tubes 50 are selected of a size which will distribute fuel from a malfunctioning valve to approximately one third of the remaining valves. This effectively provides the benefits described above and also minimizes to a negligible degree any fluid pressure head effect which would cause the lower nozzles 14 to burn hotter than the upper nozzles when they are disposed in a vertical plane as shown herein.

Modifications of the preferred embodiment herein described will occur to those skilled in the art within the spirit and scope of the invention which is to be derived solely from the appended claims.

Having thus described the invention, what is claimed as novel and desired to be secured by Letters Patent of the United States is:

1. A system for delivering fuel to a plurality of fuel nozzles wherein
   each nozzle comprises a high capacity fuel discharge means and a low capacity fuel discharge means, and condition responsive means for switching from the high capacity means to the low capacity,
   and means for automatically distributing fuel from the high capacity discharge means of any given nozzle to a plurality of other fuel nozzles in the event that the given nozzle fails to switch from the high capacity discharge means to the low capacity discharge means.

2. A fuel delivery system as in claim 1 wherein the means for switching from the high capacity discharge means to the low capacity discharge means are actuated in response to fuel pressure falling below a given value.

3. A fuel delivery system as in claim 1 wherein the plurality of fuel nozzles are employed in combination with an annular combustor,
   a manifold for receiving pressurized fluid is provided, and
   connections are provided between the manifold and the fuel discharge means of each nozzle for the flow of fuel thereto.

4. A fuel delivery system as in claim 3 wherein the fuel discharge means of each nozzle comprises a first and a second atomizing nozzle,
   the connection from the manifold to each fuel nozzle comprises a first passageway leading directly to the first atomizing nozzle and a second passageway leading to the second atomizing nozzle,
   a valve is provided in said second passageway, said valve being responsive to fuel pressure to provide the means for switching between low and high capacity discharge means,
   said interconnecting means extending from each fuel nozzle to the adjacent nozzle on either side thereof and connecting said second passageways between said valves and said second atomizing nozzles.

References Cited
UNITED STATES PATENTS 2,963,862  12/1960  Jay _____ 60—39.74
3,159,971  12/1964  Moebius et al. _____ 60—39.74

JULIUS E. WEST, *Primary Examiner.*